(12) United States Patent
Timmel

(10) Patent No.: US 7,092,524 B1
(45) Date of Patent: Aug. 15, 2006

(54) DEVICE FOR AND METHOD OF CRYPTOGRAPHICALLY WRAPPING INFORMATION

(75) Inventor: Paul Stephen Timmel, Baltimore, MD (US)

(73) Assignee: The United States of America as represented by the National Security Agency, Washington, DC (US)

( * ) Notice: Subject to any disclaimer, the term of this patent is extended or adjusted under 35 U.S.C. 154(b) by 683 days.

(21) Appl. No.: 10/299,094

(22) Filed: Nov. 15, 2002

(51) Int. Cl.
*H04K 1/00* (2006.01)
*H04L 9/00* (2006.01)

(52) U.S. Cl. .................... 380/28; 380/22; 380/42; 713/189; 713/180

(58) Field of Classification Search ................. 380/22
See application file for complete search history.

(56) References Cited

U.S. PATENT DOCUMENTS

| 4,924,515 | A | * | 5/1990 | Matyas et al. ............. 380/280 |
| 5,995,625 | A | * | 11/1999 | Sudia et al. .................. 705/51 |
| 6,256,733 | B1 | | 7/2001 | Thakkar et al. |
| 6,260,142 | B1 | | 7/2001 | Thakkar et al. |
| 6,829,355 | B1 | * | 12/2004 | Lilly ........................... 380/28 |
| 6,907,127 | B1 | * | 6/2005 | Kravitz et al. ............ 380/277 |
| 6,941,459 | B1 | * | 9/2005 | Hind et al. ................. 713/167 |
| 2003/0002662 | A1 | * | 1/2003 | Nishioka et al. ............. 380/30 |

OTHER PUBLICATIONS

Fips Pub 46-3 Des, Oct. 25, 1999, Dept. of Commerce.
Fips Pub 197, Aes, Nov. 26, 2001, Dept. of Commerce.
AFC2630, 1999, The Internet Society.

* cited by examiner

*Primary Examiner*—Emmanuel L. Moise
*Assistant Examiner*—Shewaye Gelagay
(74) *Attorney, Agent, or Firm*—Robert D. Morelli

(57) ABSTRACT

A device for and method of cryptographically wrapping information by first constructing information to be wrapped into an even multiple of y bits. Information to be wrapped is parsed into equal blocks $P_1, P_2, \ldots, P_n$. Next, registers $R_i$ are loaded with the blocks $P_i$. Next, an initialization vector IV is stored into a register A. Set $j=0$. Set $i=1$. Set $t=(n \times j)+i$. Concatenate A and $R_i$. Encrypt the result of the last step to form $2y$ encrypted bits. Divide the encrypted bits into a first set of y bits and a second set of y bits. Set $R_i$ equal to the first set. Combine the second set with t using a user-definable function. Set A equal to the combination. If $i=n$ then increment j and reset $i=1$; otherwise, increment i. If j is equal to a user-definable number then return A, $R_1$, $R_2, \ldots, R_n$ as the cryptographically wrapped information and stop. Otherwise, return to the step where t is set.

16 Claims, 4 Drawing Sheets

DEVICE FOR AND METHOD OF CRYPTOGRAPHICALLY WRAPPING INFORMATION

FIELD OF THE INVENTION

This invention relates to cryptography and, more particularly, to key management.

BACKGROUND OF THE INVENTION

The National Institute of Standards and Technology (NIST), an agency of the U.S. Department of Commerce's Technology Administration, announced the approval of the Federal Information Processing Standard (FIPS) for the Advanced Encryption Standard (AES) as described in FIPS Publication 197 (FIPS PUB 197), which is hereby incorporated by reference into the present specification. This standard specifies a symmetric encryption algorithm that may be used by U.S. Government organizations to protect sensitive, but unclassified, information.

The AES was designed to replace the Digital Encryption Standard (DES). However, Triple DES remains an approved algorithm for U.S. Government use for the foreseeable future. Single DES is being phased out of use, and is currently permitted only in legacy systems. DES and Triple DES are described in FIPS PUB 46-3, which is incorporated by reference into the specification of the present invention.

The length of a cryptographic key (hereinafter referred to as a key) used with AES may be either 128 bits, 192 bits, or 256 bits. For these key lengths, there are $3.4 \times 10^{38}$ possible 128-bit keys, $6.2 \times 10^{57}$ possible 192-bit keys, and $1.1 \times 10^{77}$ possible 256-bit keys or on the order of $10^{21}$ more keys than are possible with the 56-bit key required by DES (i.e., $7.2 \times 10^{16}$ possible 56-bit keys).

Any cryptographic method is rendered useless if an adversary can obtain the key used to encrypt information, which is commonly referred to as a content-encryption key or CEK. Therefore, a secure key management is needed for any encryption method including AES.

One approach to key management is to protect the CEK by encrypting it with another cryptographic key, which is commonly referred to as a key-encryption key or KEK. Two such methods are described in a document published in 1999 by The Internet Society concerning Cryptographic Message Syntax entitled "RFC2630." This document describes two methods of encrypting, or wrapping, CEKs for use with Triple DES and RC2, respectively.

The first step of the Triple DES key wrapping method is setting odd parity for each of the DES key octets comprising the CEK.

The second step of the Triple DES key wrapping method is forming ICV by computing an 8 octet key checksum value on CEK. The preferred method of forming ICV is by computing a 20 octet message digest on the CEK using the Secure Hashing Algorithm (SHA-1) and using the most significant, or first, eight octets of the message digest value as ICV.

The third step of the Triple-DES key wrapping method is forming CEKICV by concatenating CEK and ICV.

The fourth step of the Triple-DES key-wrapping method is generating an initialization vector (IV) as 8 random octets.

The fifth step of the Triple-DES key-wrapping method is forming TEMP1 by encrypting CEKICV in DES Cipher Block Chaining (CBC) mode using a KEK and IV.

The sixth step of the Triple-DES key-wrapping method is forming TEMP2 by concatenating IV and TEMP1.

The seventh step of the Triple-DES key-wrapping method is forming TEMP3 by reversing the order of the octets in TEMP2. That is, swapping the most significant, or first, octet with the least significant, or last, octet, and so on.

The eighth, and last, step of the Triple-DES key-wrapping method is encrypting TEMP3 in CBC mode using the KEK and 0x4adda22c79e82105 as IV. The length of the resulting ciphertext is 40 octets.

This Triple DES key wrapping method requires that a different IV be used when the same CEK is wrapped using a different KEK.

The first step of the RC2 key wrapping method is setting LENGTH equal to the length of the CEK, where LENGTH is a single octet.

The second step of the RC2 key wrapping method is forming LCEK by concatenating LENGTH and CEK.

The third step of the RC2 key wrapping method is forming LCEKPAD by concatenating LCEL with PAD, where PAD is the fewest number, including zero, of random octets that make the length of LCEKPAD a multiple of 8.

The fourth step of the RC2 key wrapping method is forming ICV by computing an 8 octet key checksum value on LCEKPAD. The preferred method of forming ICV is by computing a 20 octet message digest on the LCEKPAD using the Secure Hashing Algorithm (SHA-1) and using the most significant, or first, eight octets of the message digest value as ICV.

The fifth step of the RC2 key wrapping method is forming LCEKPADICV by concatenating LCEKPAD with ICV.

The sixth step of the RC2 key wrapping method is forming an initialization vector (IV) by generating 8 random octets.

The seventh step of the RC2 key wrapping method is forming TEMP1 by encrypting LCEKPADICV in CBC mode using a KEK and IV.

The eighth step of the RC2 key wrapping method is forming TEMP2 by concatenating IV and TEMP1.

The ninth step of the RC2 key wrapping method is forming TEMP3 by reversing the order of the octets in TEMP2. That is, swapping the most significant, or first, octet with the least significant, or last, octet, and so on.

The tenth, and last, step of the RC2 key wrapping method is is encrypting TEMP3 in CBC mode using the KEK and 0x4adda22c79e82105 as IV. The length of the resulting ciphertext is 40 octets.

This RC2 key wrapping method requires that a different IV be used when the same CEK is wrapped using a different KEK.

U.S. Pat. No. 5,995,625, entitled "ELECTRONIC CRYPTOGRAPHIC PACKING," discloses a method of unwrapping wrapped digital data by obtaining an acceptance phrase from a user, deriving a cryptographic key from the acceptance phrase, and unwrapping the wrapped digital data using the derived cryptographic key. The present invention does not derive a key from an acceptance phrase provided by a user. The present invention also differs from U.S. Pat. No. 5,995,625 in other ways as described below. U.S. Pat. No. 5,995,625 is hereby incorporated by reference into the specification of the present invention.

U.S. Pat. Nos. 6,256,733 and 6,260,142, both entitled "ACCESS AND STORAGE OF SECURE GROUP COMMUNICATION CRYPTOGRAPHIC KEYS," disclose a device for and method of securing stored security credentials by encrypting, by various members of a group, at least a portion of the stored security credentials. The present invention does not require actions by members of a group. The present invention also differs from U.S. Pat. Nos. 6,256,733 and 6,260,142 in other ways as described below. U.S. Pat. Nos. 6,256,733 and 6,260,142 are hereby incorporated by reference into the specification of the present invention.

The present invention is such a secure key management method for AES.

SUMMARY OF THE INVENTION

It is an object of the present invention to cryptographically wrap information so that the wrapped information is at least as wide as the output of an encryptor used to wrap the information.

It is another object of the present invention to cryptographically wrap information that includes integrity data so that the wrapped information and integrity data is at least as wide as the output of an encryptor used to wrap the information.

The present invention is a device for and method of cryptographically wrapping information.

If the information to be wrapped is not an even multiple of y bits then the information is made to be so.

Next, the information is parsed into blocks $P_1, P_2, \ldots, P_n$, where each block is y-bits.

Next, n registers in a shift-register are loaded with the blocks.

Next, a register is loaded with an initialization vector IV, where IV is y-bits.

Next, the following method is conducted or implemented in a device.

Set j=0.
Set i=1.
Set t to a user-definable value.
Combine A and $R_i$.
Encrypt the combination of A and $R_i$.
Form a first y-bit string and a second y-bit string from the encrypted result, in an invertible manner.
Set $R_i$ equal to the first y-bit string.
Combine the second y-bit string with t.
Set A equal to the combination of the second y-bit string with t.
If i=n then increment j and reset i=1. Otherwise, increment i.
If j is equal to a user-definable number then return A, $R_1$, $R_2, \ldots, R_n$ as the cryptographically wrapped information and stop. Otherwise, return to the step where t is set.

DETAILED DESCRIPTION

The present invention is a device for and method of encrypting, or cryptographically wrapping, information so that the wrapped information is at least as wide as the output of an encryptor used to wrap the information. In the preferred embodiment, the information to be wrapped is a content-encryption-key (CEK), which is used to encrypt plaintext. Wrapping a CEK aids in protecting the CEK from compromise. However, the present invention may be used to wrap information of any type. Furthermore, additional information such as integrity data may be included with the information to be wrapped.

Figure 1:
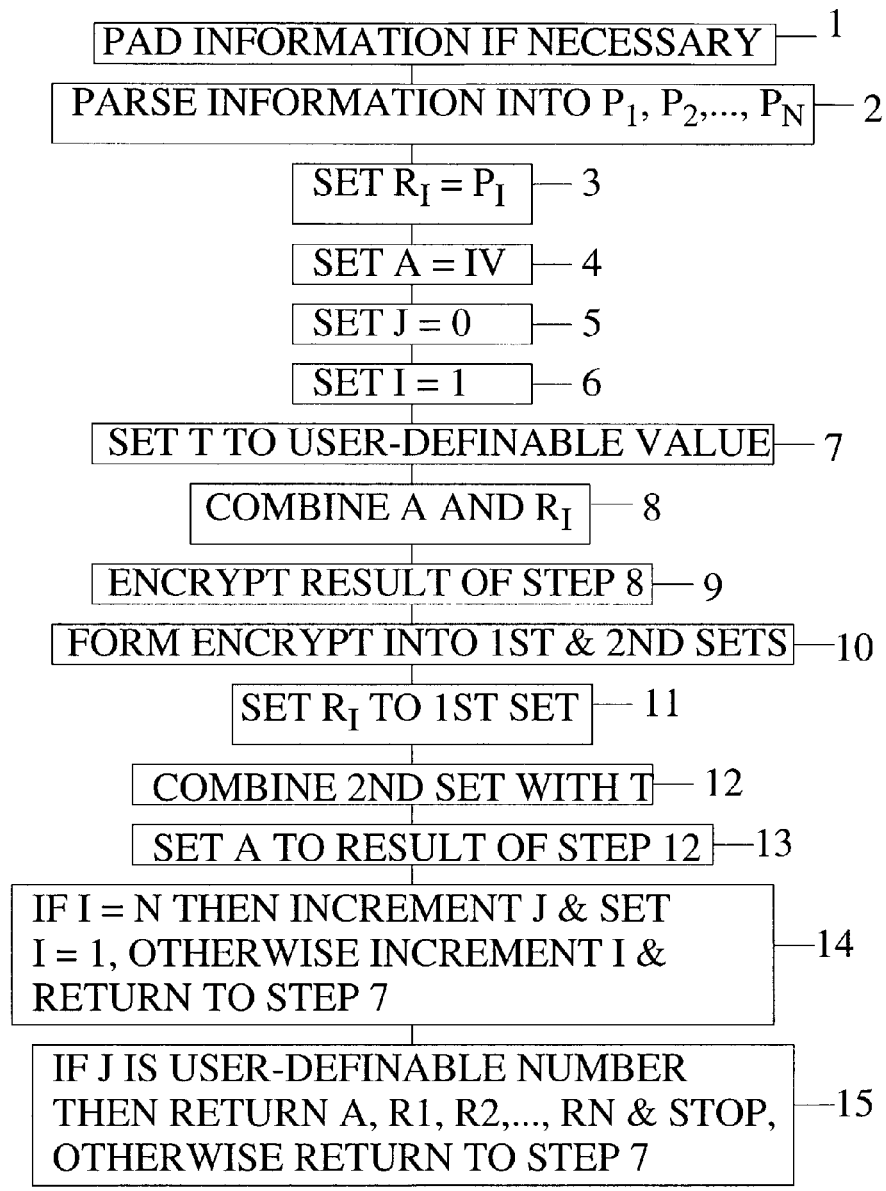
FIG. 1 is a flowchart of the cryptographic wrapping method of the present invention.

FIG. 1 is a list of the wrapping steps according to the present invention.

The first step 1 of the wrapping method is padding, if necessary, the information to be wrapped so that the length of the result is an even multiple of y bits, where y is equal to half of the number of outputs bits of the encryptor used in the method. Any suitable padding scheme may be used (e.g., pad with zeros, pad with ones, pad with a random number, pad with a predetermined string of ones and zeros, pad at the beginning, pad at the end, pad anywhere within the information to be wrapped). In the preferred embodiment, the Advanced Encryption Standard (AES) is used as the encryptor. Since AES has an output of 128 bits, y is, preferably, 64 bits.

The second step 2 of the present wrapping method is parsing the result of step 1 into $P_1, P_2, \ldots, P_n$, where $P_i$ has a length of y bits. In the preferred embodiment $P_i$ has a length of 64 bits.

The third step 3 of the present wrapping method is setting $R_i = P_i$, where i=1, 2, ..., n, where n is equal to the length of the information to be wrapped divided by y. The present invention may be used for any value of n.

The fourth step 4 of the present wrapping method is setting A equal to a user-definable initialization vector (IV), where IV has a length equal to y. The IV is the additional information (e.g., integrity data) that a user may add too the information to be wrapped.

The fifth step 5 of the present wrapping method is setting j=0.

The sixth step 6 of the present wrapping method is setting i=1.

The seventh step 7 of the present wrapping method is setting t to a user-definable value. In the preferred embodiment, t=(n×j)+i.

The eighth step 8 of the present method is combining A and $R_i$ in an invertible manner to form a bit string of 2y bits. In the preferred embodiment, A and $R_i$ are concatenated so that A forms the high order bits of the result, and $R_i$ forms the low order bits. However, any other suitable combination of A and $R_i$ may be used in the present invention.

The ninth step 9 of the present wrapping method is encrypting the result of the eighth step 8 using an encryptor that has an output that is 2y bits in length. In the preferred embodiment, AES is used as the encryptor. The output of AES is 128 bits in length. Therefore, y is 64 bits when AES is used as the encryptor. AES allows the use of three different length encryption keys (i.e., 128 bits, 196 bits, and 256 bits). The greater the bits in the AES key, the greater the security in the output of AES. When the AES key is used to encrypt a CEK, the AES key is commonly referred to as a key-encryption key (KEK).

The tenth step 10 of the present wrapping method is forming, in an invertible manner, a first user-definable set of y bits and a second user-definable set of y bits from the result of the ninth step 9. In the preferred embodiment, the first user-definable set of y bits is the 64 least significant bits of the result of the ninth step 9, and the second user-definable set of y bits is the 64 most significant bits of the result of the ninth step 9. However, any other suitable two groupings of the result of the ninth step 9 are possible (e.g., a user-definable linear combination of bits from the result of the ninth step 9).

The eleventh step 11 of the present wrapping method is setting $R_i$ equal to the first user-definable set.

The twelfth step 12 of the present method is combining the second user-definable set with t using a user-definable invertible function. In the preferred embodiment, the user-definable invertible function is a bit-wise exclusive-or function (XOR). However, any other suitable invertible function may be used (e.g., modular adder, modular subtractor).

The thirteenth step 13 of the present wrapping method is setting A equal to the result of the twelfth step 12.

If i=n then the fourteenth step 14 of the present wrapping method is incrementing j and setting i=1. Otherwise, incrementing i.

If j is equal to a user-definable number then the fifteenth step 15 of the present wrapping method is returning A, $R_1$, $R_2$, . . . , $R_n$ as the wrapped information and stopping. Otherwise returning to the seventh step 7. The user-definable number determines the number of cycles for the wrapping method and, therefore, the total number of steps in the method. In the preferred embodiment, the user-definable number is 6. If the user-definable number is 6 then the total number of steps of the present wrapping method is 6n.

Figure 2:
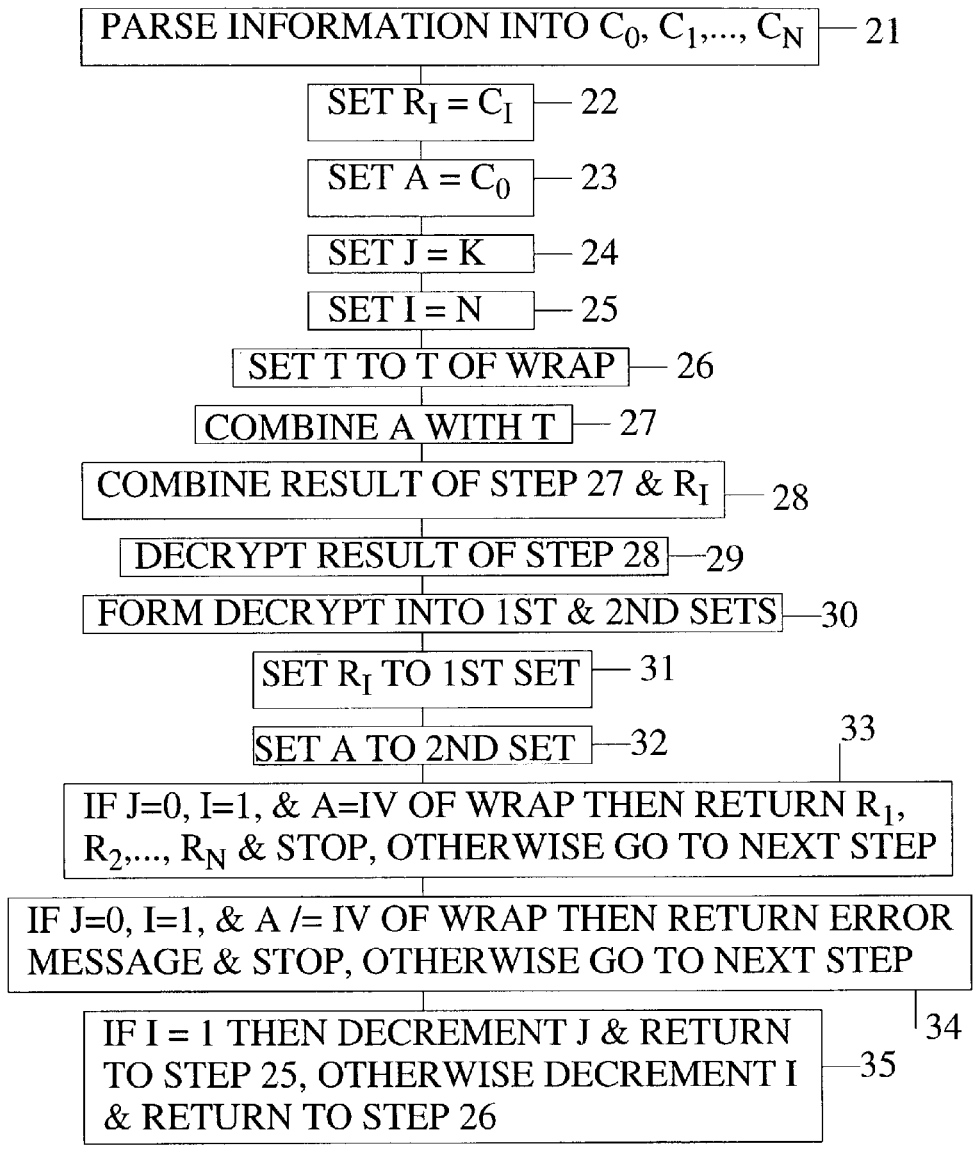
FIG. 2 is a flowchart of the cryptographic unwrapping method of the present invention.

FIG. 2 is a list of steps for unwrapping information that was wrapped using the method of FIG. 1.

The first step 21 of the present unwrapping method is parsing the wrapped information into $C_0, C_1, \ldots, C_n$, where $C_i$ has a length of y bits. The y value and encryptor used in the unwrap method must be the same as those used to wrap the information.

The second step 22 of the present unwrapping method is setting $R_i=C_i$, where i=1, 2, . . . , n, where n is the same as that used to wrap the information.

The third step 23 of the present unwrapping method is setting $A=C_0$.

The fourth step 24 of the present unwrapping method is setting j=k−1, where k is a user-definable positive integer. The value of k must be the same as the user-definable number used to wrap the information. In the preferred embodiment, k is 6.

The fifth step 25 of the present unwrapping method is setting i=n, where n must be the same as the value of n used to wrap the information (i.e., the number of y-bit blocks in the information to be wrapped).

The sixth step 26 of the present unwrapping method is setting t equal to the value of t used to wrap the information.

The seventh step 27 of the present unwrapping method is combining A with t using a user-definable function that is the inverse of the user-definable invertible function used to wrap the information. Note that XOR is the inverse of XOR.

The eighth step 28 of the unwrapping method is combining the result of the seventh step 27 and $R_i$ in a manner that is the inverse of the method used during the wrapping of the information to form the first user-definable set of y bits and the second user-definable set of y bits.

The ninth step 29 of the present unwrapping method is decrypting the result of the eighth step 28. The decryptor must perform the inverse of the encryptor used to wrap the information.

The tenth step 30 of the present wrapping method is forming a first user-definable set of y bits and a second user-definable set of y bits from the result of the ninth step 29 in a manner that is the inverse of the method used to combine A and $R_i$ during the wrapping of the information. In the preferred embodiment, the first user-definable set of y bits is the 64 least significant bits of the result of the ninth step 29, and the second user-definable set of y bits is the 64 most significant bits of the result of the ninth step 29.

The eleventh step 31 of the present unwrapping method is setting $R_i$ equal to the first user-definable set of y bits.

The twelfth step 32 of the present unwrapping method is setting A equal to the second user-definable set of y bits.

If j is equal to 0, i is equal to 1, and A is equal to the IV used to wrap the information then the thirteenth step 33 of the present unwrapping method is returning $R_1, R_2, \ldots, R_n$ as the unwrapped information and stopping. Otherwise, proceeding to the next step.

If j is equal to 0, i is equal to 1, and A is not equal to the IV used to wrap the information then the fourteenth step 34 of the present unwrapping method is returning an error message and stopping. Otherwise, proceeding to the next step.

If i=1 then the fifteenth step 35 of the present unwrapping method is decrementing j and returning to step 25. Otherwise, decrementing i and returning to the sixth step 26.

Figure 3:
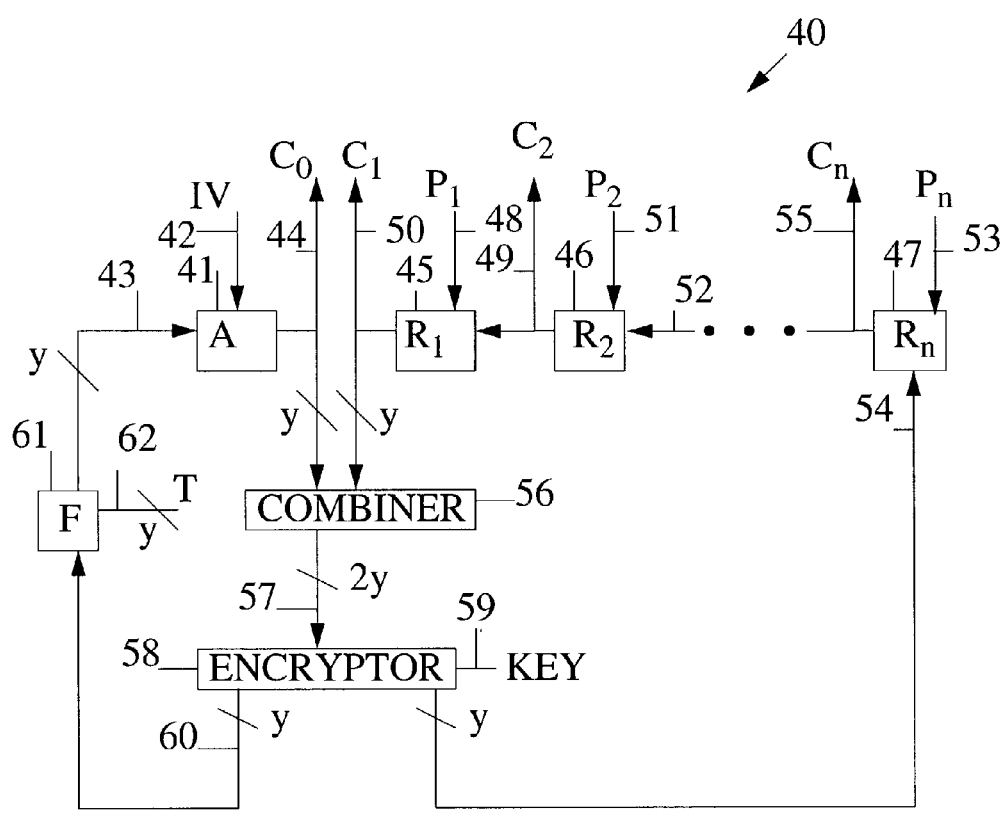
FIG. 3 is a schematic of the cryptographic wrapping device of the present invention.

FIG. 3 is a schematic of the wrapping device 40 of the present invention.

The wrapping device 40 includes an A register 41 for receiving an initialization vector (IV). The IV is additional data (e.g., integrity data) that will be wrapped with the other information to be wrapped. The A register 41 has a y-bit input 42 for receiving the IV, a y-bit input 43 for receiving data from the wrapping device 40, and a y-bit output 44 at which will appear a y-bit portion of the wrapped information (i.e., $C_0$) after the wrapping device 40 has been stepped a user-definable number of times. Note that the input 42 for receiving the IV may be combined with the input 43 if properly configured. In the preferred embodiment, y is 64.

The wrapping device 40 also includes n registers $R_1$, $R_2, \ldots, R_n$, 45, 46, 47 connected as a shift-register, where each is identical to the A register 41.

The $R_1$ register 45 has a y-bit input 48 for receiving a portion of the information to be wrapped (i.e., $P_1$), a y-bit input 49 for receiving input from the $R_2$ register 46, and a y-bit output 50. In the preferred embodiment, the information to be wrapped is a CEK and the portions received into each R register 45, 46, 47 (i.e., $P_1, P_2, \ldots, P_n$, respectively). Note that an input to an R register 45, 46, 47 for receiving a portion of the information to be wrapped may be the same as the corresponding input for receiving data from another R register 46, 47 or the wrapping device 40 if properly configured. After the wrapping device 40 is stepped a user-definable number of times, a y-bit portion (i.e., $C_1$) of the wrapped information will appear at the output 50 of the $R_1$ register 45.

The $R_2$ register 46 has a y-bit input 51 for receiving a portion of the information to be wrapped (i.e., $P_2$), a y-bit input 52 for receiving input from the precceding R register in the shift-register chain, and a y-bit output 49. After the wrapping device 40 is stepped a user-definable number of times, a y-bit portion (i.e., $C_2$) of the wrapped information will appear at the output 49 of the $R_2$ register 46.

The $R_n$ register 47 (i.e., the right-most register in the shift-register) has a y-bit input 53 for receiving a portion of the information to be wrapped (i.e., $P_n$), a y-bit input 54 for receiving input from the wrapping device 40, and a y-bit output 49. After the wrapping device 40 is stepped a user-definable number of times, a y-bit portion (i.e., $C_n$) of the wrapped information will appear at the output 55 of the $R_n$ register 47.

The output 44 of the A register 41 and the output 50 of the $R_1$ register 45 are connected to a combiner 56 which combines its inputs in a user-definable manner. In the preferred embodiment, the combiner 56 concatenates its inputs so that the output 44 of the A register 41 constitutes the most significant bits of the output 57 of the combiner 56 and the output 50 of the $R_1$ register 45 constitute the least significant bits of the output 57 of the combiner 56. However, any other suitable invertible function may be performed by the combiner 56. The output 57 of the combiner 56 is 2y bits.

The output 57 of the combiner 56 is connected to the input of an encryptor 58 that accepts 2y bits, encrypts the same using an encryption key via a encryption-key input 59, and produces 2y encrypted bits, half of which appears at a first output bus 54 and the other half of which appears at a second output bus 60. In the preferred embodiment, AES is used as the encryptor. AES accepts 128 bits, which forces y to be 64, encrypts the same using an encryption key of one of three widths (i.e., 128 bits, 192 bits, and 256 bits), and produces a 128-bit encrypted output. The more bits in the encryption key, the harder it is for an adversary to defeat the encryption process. In the preferred embodiment, the first output bus 54 of the encryptor 58 contains the least significant half of the encryptor's output in order, and the second output bus 60 of the encryptor 58 contains the most significant half of the encryptor's output in order. However, any other suitable invertible two groupings of the output bits of the encryptor 58 onto the first output bus 54 and the second output bus 60 may be used.

The first output bus 54 of the encryptor 58 is connected to the input of the $R_n$ register 47.

The second output bus 60 of the encryptor 58 is connected to a first input of a function block F 61. The function block F 61 has a second input for receiving a y-bit user-definable value T. The function block F 61 performs a user-definable invertible function on its two inputs and produces a y-bit output that is connected to the input 43 of the A register 41. In the preferred embodiment, the function performed by the function block F 61 is a bit-wise exclusive-or function. However, any other suitable invertible function (e.g., modular adder, modular subtractor) may be performed by the function block F 61.

Figure 4:
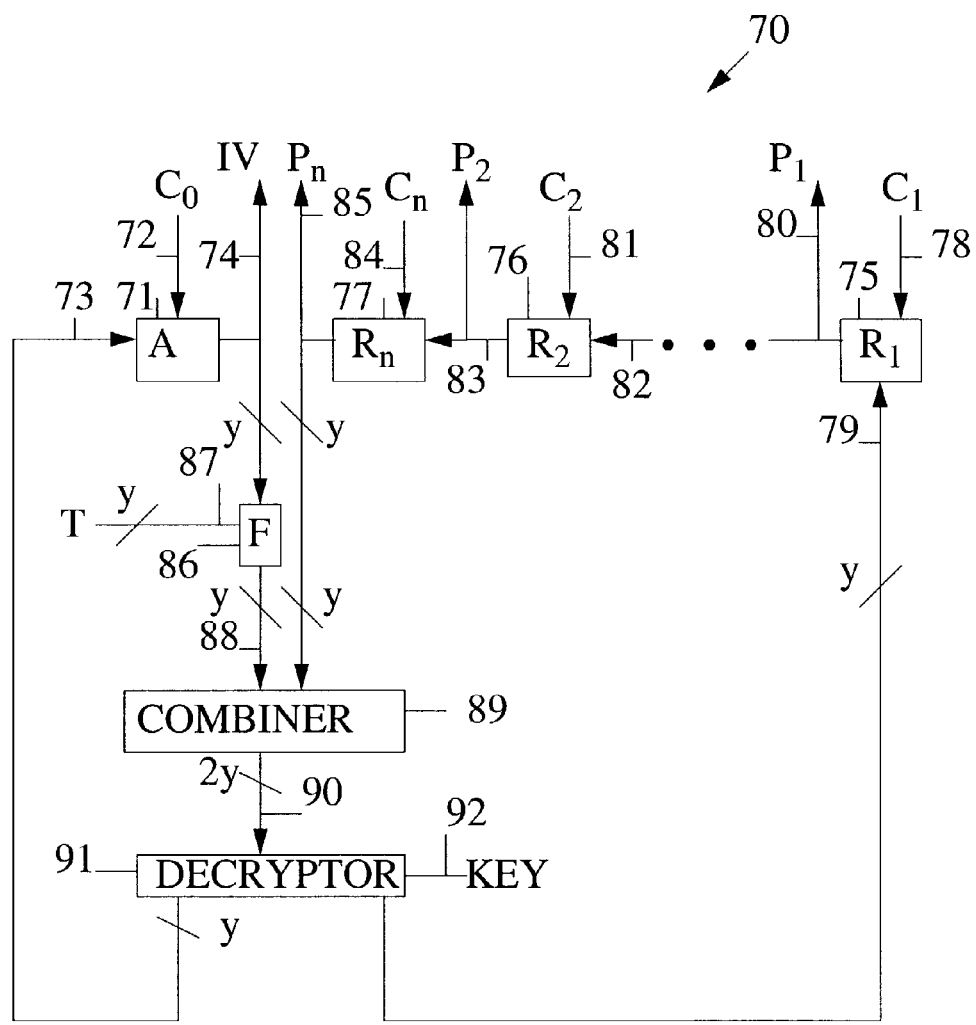
FIG. 4 is a schematic of the cryptographic unwrapping device of the present invention.

FIG. 4 is a schematic of the unwrapping device 70 of the present invention.

The unwrapping device 70 includes an A register 71 for receiving a y-bit portion (i.e., $C_0$) of wrapped information. The A register 71 has a y-bit input 72 for receiving $C_0$, a y-bit input 73 for receiving data from the unwrapping device 70, and a y-bit output 74 at which will appear the IV used during the wrapping operation after the unwrapping device has been stepped the same number of times as was the corresponding wrapping device. Note that the input 72 for receiving the $C_0$ may be combined with the input 73 if properly configured. The y in the unwrapping device 70 must be the same as in the corresponding wrapping device.

The unwrapping device 70 also includes n registers $R_1$, $R_2$, . . . , $R_n$, 75, 76, 77 connected as a shift-register, where each is identical to the A register 71.

The $R_1$ register 75 has a y-bit input 78 for receiving a portion of the information to be unwrapped (i.e., $C_1$), a y-bit input 79 for receiving input from the unwrapping device 70, and a y-bit output 80 at which will appear the y-bit portion (i.e., $P_1$) of the unwrapped information after the unwrapping device has been stepped the same number of times as was the corresponding wrapping device. Note that an input to an R register 75, 76, 77 for receiving a portion of the information to be unwrapped may be the same as the corresponding input for receiving data from another R register 75, 76 or the wrapping device 70 if properly configured.

The $R_2$ register 76 has a y-bit input 81 for receiving a portion of the information to be unwrapped (i.e., $C_2$), a y-bit input 82 for receiving input from the preceding R register in the shift-register chain, and a y-bit output 83 at which will appear a y-bit portion (i.e., $P_2$) of the unwrapped information after the unwrapping device 70 is stepped the same number of times as was the corresponding wrapping device.

The $R_n$ register 77 (i.e., the left-most register in the shift-register) has a y-bit input 84 for receiving a portion of the information to be unwrapped (i.e., $C_n$), a y-bit input 83 for receiving input from the $R_2$ register 76, and a y-bit output 85 at which will appear a y-bit portion (i.e., $P_n$) of the unwrapped information after the unwrapping device 70 is stepped the same number of times as was the corresponding wrapping device.

The output 74 of the A register 71 is connected to a first input of a function block F 86. A The function block F 86 has a second input for receiving a y-bit user-definable value T. The function block F 86 performs the inverse function of function block used to wrap the information on its two inputs and produces a y-bit output 88 that is connected to a first input of a combiner 89.

The y-bit output 85 of the $R_n$ register 77 is connected to a second input of the combiner 89. The combiner 89 produces the inverse of that produced by the combiner used in the device to wrap the information. In the preferred embodiment, the combiner 89 concatenates its inputs so that the output 88 of the function block F 86 constitutes the most significant bits of the output 90 of the combiner 89 and the output 85 of the $R_n$ register 77 constitute the least significant bits of the output 90 of the combiner 89. The output 90 of the combiner 89 is 2y bits.

The output 90 of the combiner 89 is connected to the input of an decryptor 91 that accepts 2y bits, decrypts the same in the inverse manner of the encryption in the corresponding wrapping device using an appropriate decryption key via a encryption-key input 92, and produces 2y encrypted bits, half of which appears at a first output bus 79 and the other half of which appears at a second output bus 73. The first output bus 79 of the decryptor 91 contains the same bits as did the output of $R_i$ register in the device used to wrap the information. The second output bus 73 contains the same bits as did the output of A register in the device used to wrap the information.

The first output bus 79 of the decryptor 91 is connected to the input of the $R_1$ register 75.

The second output bus 73 of the decryptor 91 is connected to the input of the A register 71.

What is claimed is:

1. A method of cryptographically wrapping information, comprising the steps of:
   (a) if the information is not an even multiple of y bits then padding the information to a length that is an even multiple of y bits;
   (b) parsing the result of step (a) into $P_1, P_2, \ldots, P_n$, where $P_i$ has a length of y bits for i=1,
   (c) setting $R_i = P_i$, where i=1, 2, . . . , n, where n is equal to the length of the information divided by y;
   (d) setting A equal to a user-definable initialization vector IV, where IV has a length equal to y;
   (e) setting j=0;
   (f) setting i=1;
   (g) setting t to a user-definable value;
   (h) combining A and $R_i$;
   (i) encrypting the result of step (h) using an encryptor that puts out 2y bits;
   (j) forming a first user-definable set of y bits and a second user-definable set of y bits from the result of step (i) in an invertible manner;
   (k) setting $R_i$ equal to the first user-definable set of y bits;

(l) combining the second user-definable set of y bits with t using a user-definable function;

(m) setting A equal to the result of step (l);

(n) if i=n then incrementing j and reset i=1, otherwise incrementing i; and (o) if j is equal to a user-definable number then returning A, $R_1$, $R_2$, . . . , $R_n$ as the cryptographically wrapped information and stopping, otherwise returning to step (g).

2. The method of claim 1, wherein said step of padding the information to a length that is an even multiple of y bits is selected from the group of padding steps comprising padding with zeros, padding with ones, padding with a random number, padding with a predetermined string of ones and zeros, padding a first end of the information, padding a second end of the information, padding within the information, and any combination thereof.

3. The method of claim 1, wherein said step of padding the information to a length that is an even multiple of y bits is comprised of the step of padding the information to a length that is an even multiple of y bits, where y is 64.

4. The method of claim 1, wherein said step of combining A and $R_i$ is comprised of the step of concatenating A and $R_i$ so that A constitutes high order bits and $R_i$ constitutes low order bits.

5. The method of claim 1, wherein said step of setting t to a user-definable value is comprised of the step of setting t=(n×j)+i.

6. The method of claim 1, wherein said step of encrypting the result of step (h) using an encryptor that puts out 2y bits is comprised of the step of encrypting the result of step (h) using the Advanced Encryption Standard.

7. The method of claim 1, wherein said step of forming a first user-definable set of y bits and a second user-definable set of y bits from the result of step (i) is comprised of forming a first user-definable set of the 64 least significant bits and a second user-definable set of 64 most significant bits from the result of step (i).

8. The method of claim 1, wherein said step of combining the second user-definable set with t using a user-definable function is comprised of the step of combining the second user-definable set with t using a user-definable function selected from the group of functions comprising a bit-wise exclusive-or function, a modular addition function, and a modular subtraction function.

9. The method of claim 1, wherein said step of returning A, $R_1$, $R_2$, . . . , $R_n$ as the cryptographically wrapped information and stopping if j is equal to a user-definable number is comprised of the step of returning A, $R_1$, $R_2$, . . . , $R_n$ as the cryptographically wrapped information and stopping if j is equal to 6.

10. A method of cryptographically unwrapping cryptographically wrapped information, comprising the steps of:

(a) parsing the wrapped information into $C_0$, $C_1$, . . . , $C_n$, where $C_i$ has a length of y bits, where y is the same as that used in forming the wrapped information;

(b) setting $R_i=C_i$, where i=1, 2, . . . , n, where n is the same as that used in forming the wrapped information;

(c) setting $A=C_0$;

(d) setting j=k−1, where k is the same as a user-definable number used to form the wrapped information;

(e) setting i=n;

(f) setting t to the same value of t used to form the wrapped information;

(g) combining A with t using a function that is the inverse of a function used to combine corresponding values to form the wrapped information;

(h) combining the result of step (g) and $R_i$ in a manner that is the inverse of a method used during the wrapping of the information to form two user-definable sets of y bits;

(i) decrypting the result of step (h), using the inverse function of an encryptor used to form the wrapped information;

(j) forming a first user-definable set of y bits and a second user-definable set of y bits from the result of step (i) in a manner that is the inverse of that to combine A and $R_i$ to form the wrapped information;

(k) setting $R_i$ equal to the first user-definable set of y bits;

(l) setting A equal to the second user-definable set of y bits;

(m) if j=0, i=1, and A=IV used to form the wrapped information then returning $R_1$, $R_2$, . . . , $R_n$ as the unwrapped information and stopping, otherwise proceeding to the next step;

(n) if j=0, i=1, and A is not equal to IV then returning an error message and stopping, otherwise, proceeding to the next step; and (o) if i=1 then decrementing j and returning to step (e), otherwise decrementing i and returning to step (f).

11. A device for cryptographically wrapping information, comprising:

(a) a first register A, having a first y-bit input, a second y-bit input, and a y-bit output;

(b) n registers $R_1$, $R_2$, . . . , $R_n$, connected as a shift-register, where each of the n registers $R_1$, $R_2$, . . . , $R_n$ has a first y-bit input, a second y-bit input, and a y-bit output;

(c) a combiner, having a first input connected to the output of the first register A, having a second input connected to the output of register $R_1$;

(d) an encryptor, having a first input connected to the output of the combiner, having a second input, and having a 2y-bit output configured as a first y-bit output bus connected to the second input of register $R_n$ and a second y-bit bus; and (e) a function block, having a first input connected to the second y-bit output bus of the encryptor, having a second input for receiving a y-bit user-definable value T, and having a y-bit output connected to the second input of the first register A.

12. The device of claim 11, wherein y is 64.

13. The device of claim 11, wherein the combiner is a concatenator.

14. The device of claim 11, wherein the encryptor is the Advanced Encryption Standard, having the a first 64-bit output bus that carries the least significant bits of the output of the combiner and a second 64-bit bus that carries the most significant bits of the output of the combiner.

15. The device of claim 11, wherein the function block is a function block selected from the group of function blocks comprising a bit-wise exclusive-or function block, a modular adder, and a modular subtractor.

16. A device for cryptographically unwrapping cryptographically wrapped information, comprising:

(a) a first register A, having a first y-bit input, where y is the same as that used to form the wrapped information, a second y-bit input, and a y-bit output;

(b) n registers $R_1$, $R_2$, . . . , $R_n$, connected as a shift-register, where each of the n registers has a first y-bit input, a second y-bit input, and a y-bit output;

(c) a function block, having a first input connected to the output of the first register A, having a second input, and having a y-bit output that performs an inverse function of a function block used to form the wrapped information;

(d) a combiner, having a first input connected to the output of the function block, having a second input connected to the y-bit output of register $R_n$, and having a 2y-bit output, where the combiner performs an inverse function of a combiner used to form the wrapped information; and (e) a decryptor that performs the inverse of an encryptor used to form the wrapped information, having a first input connected to the output of the combiner, having a second input for receiving a decryption key that will invert an encryption process used to form the wrapped information, and having a 2y-bit output configured as an output of the encryptor used to form the wrapped information having a first y-bit bus connected to the input of register $R_1$ and a second y-bit bus connected to the input of the first register A.

* * * * *